Sept. 3, 1963 D. A. KRIES 3,102,554
POWER STEERING APPARATUS
Filed Oct. 12, 1961 2 Sheets-Sheet 1
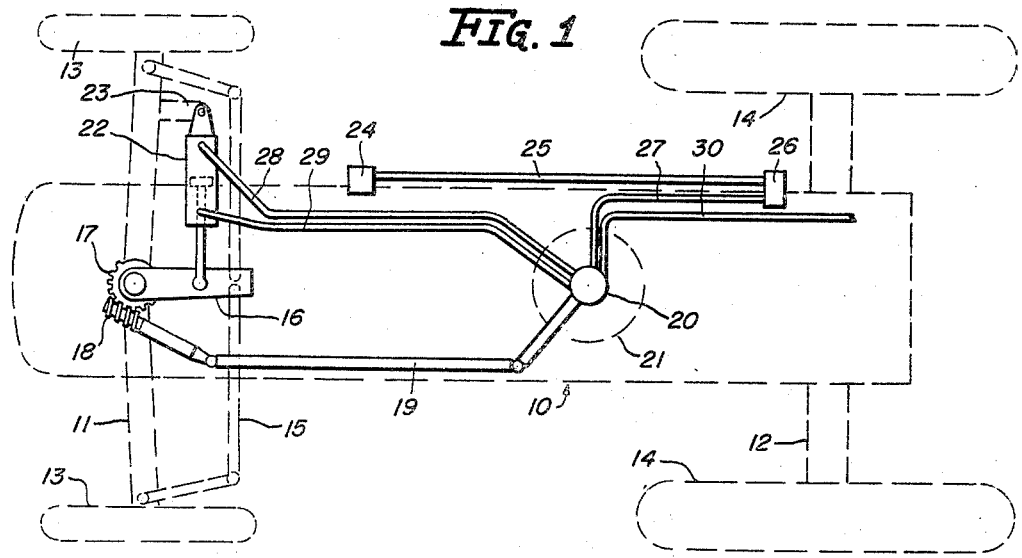
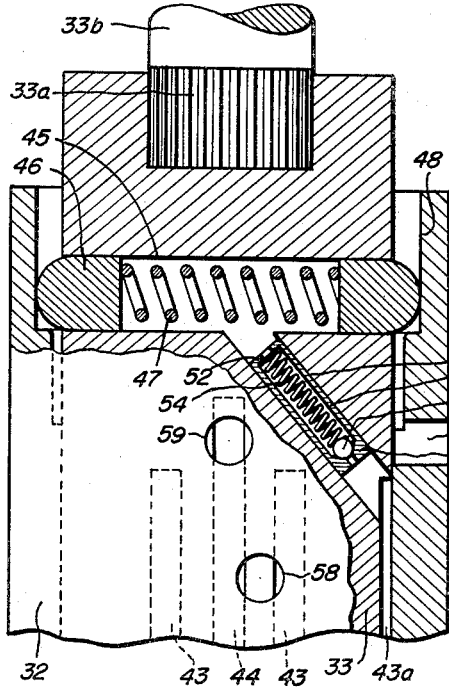
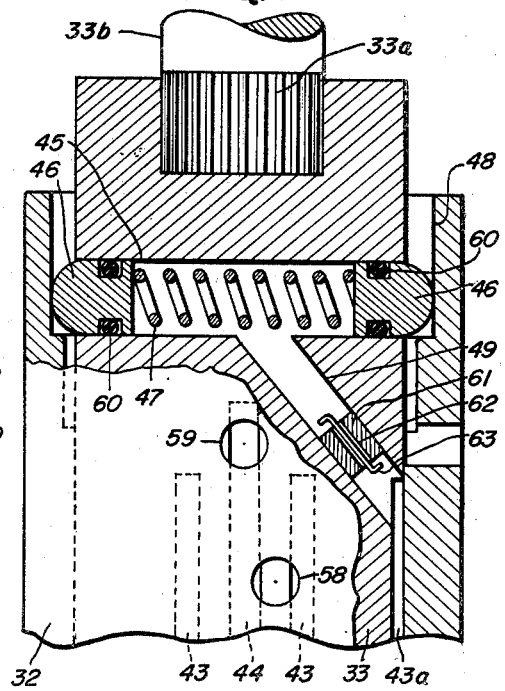
INVENTOR.
Donald A. Kries
Paul O. Pippel
Atty.

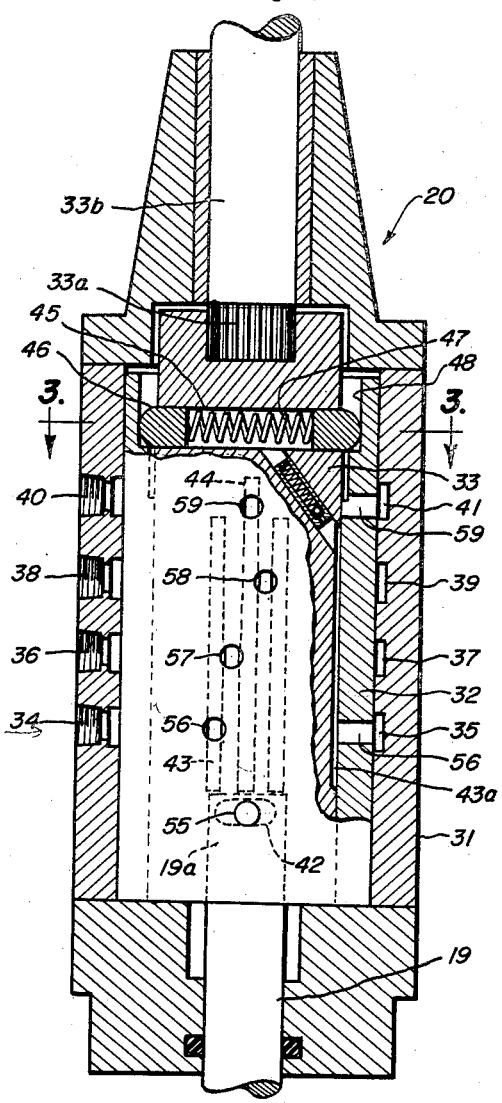
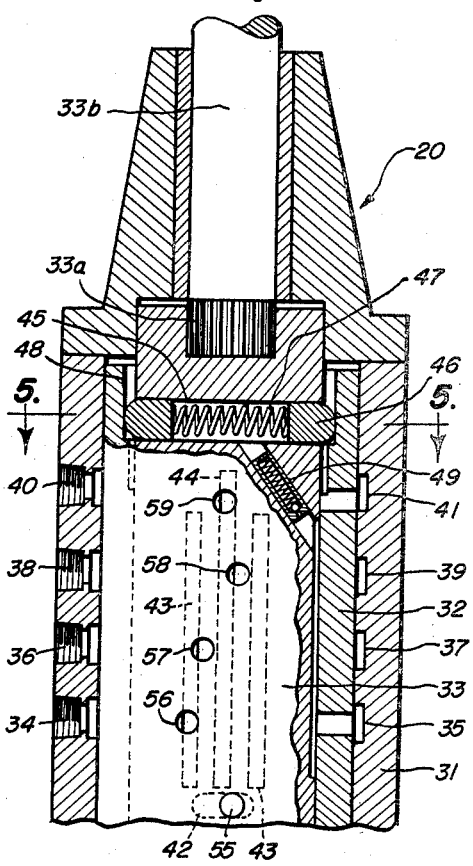
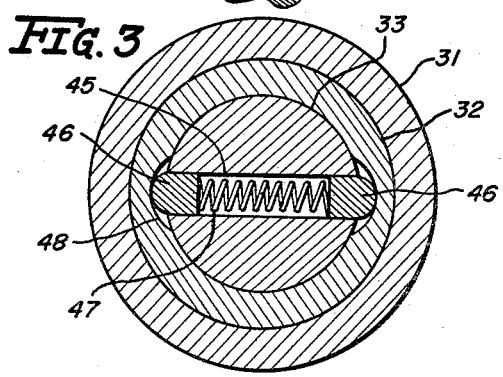
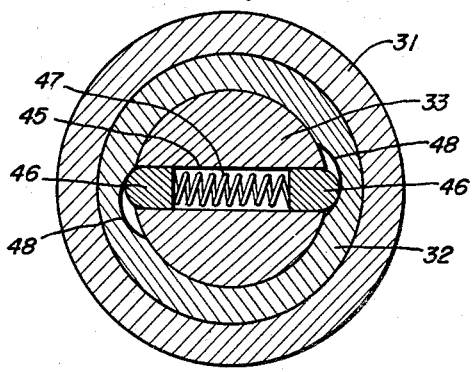
INVENTOR.
Donald A. Kries
Paul O. Pippel
Atty.

United States Patent Office  3,102,554
Patented Sept. 3, 1963

3,102,554
POWER STEERING APPARATUS
Donald A. Kries, Naperville, Ill., assignor to International Harvester Company, Chicago, Ill., a corporation of New Jersey
Filed Oct. 12, 1961, Ser. No. 144,712
14 Claims. (Cl. 137—625.24)

This invention relates generally to power steering. More particularly, it is concerned with control means for fluid pressure operated power steering apparatus which provides for smooth operation thereof.

Where power steering apparatus is used in conjunction with vehicles such as tractors, for example, the natural frequency of front wheel vibration encountered during normal operation is in the order of 8–9/second. It has been found that in conventional fluid flow control valves used for control of such an apparatus a sympathetic vibration at this frequency is established within the valve, causing an erratic and pulsating flow of fluid through the system and thus propagating and building such vibrations into a serious wheel shimmy. Dampening of the relative vibration of valve elements to a frequency in the order of 3/second will correct this defect.

Accordingly, it is an object of this invention to provide a control valve for power steering apparatus which will compensate for sympathetic vibrations set up therein by the front wheels under operating conditions.

Another object of this invention is the provision of a control valve for power steering apparatus having means which will dampen the relative vibration of its elements to a frequency less than that established in the wheels under operating conditions, thereby preventing uncontrolled flow of fluid within the apparatus and resultant wheel shimmy.

A further object of this invention is the provision of a control valve for power steering apparatus having mechanical means operating to return the valve to neutral once it has been displaced therefrom and means for providing fluid under closely controlled conditions for assisting in retarding such displacement, thereby dampening internal vibrations.

The foregoing and other objects and advantages attained by the present invention will be apparent from the description of the accompanying drawings disclosing two preferred embodiments thereof, in which:

FIG. 1 is a schematic view showing a vehicle incorporating the power steering apparatus;

FIG. 2 is an elevational view, partially in section, showing the control valve in its neutral or bypass position;

FIG. 3 is a sectional view taken along the lines 3—3 of FIG. 2;

FIG. 4 is an elevational view, partially in section, showing the control valve in its partial actuating position;

FIG. 5 is a sectional view taken along the lines 5—5 of FIG. 4;

FIG. 6 is an enlarged elevational view, partially in section, showing the dampening structure in detail, and FIG. 7 is an enlarged elevational view, partially in section, showing another embodiment of the dampening structure in detail.

Turning now to FIG. 1, the vehicle 10, which is shown as a tractor, is provided with a front axle 11 and a rear axle 12 upon which are mounted front wheels 13 and rear wheels 14, respectively.

The tie rods 15 extend from opposite ends of axle 11 to an intermediate steering arm 16 extending from the steering gear 17. Meshing with steering gear 17 is the worm gear 18 which is connected through the steering shafts 19 and the mechanical elements of the control valve 20 to the steering wheel 21.

Power assist is provided by means of a fluid system which includes the cylinder 22 mounted between the bracket 23 extending from axle 11 and steering arm 16. The input side of the steering pump 24 communicates with the fluid reservoir (not shown). The pump output line 25 communicates through the fluid divider 26 and thence through the line 27 to control valve 20. The line 28 and the line 29 communicate control valve 20 with alternate sides of cylinder 22. The return line 30 leads from control valve 20 to the fluid reservoir.

Turning now to FIGS. 2–6, control valve 20 represents an improvement over U.S. Patent 2,939,429 issued June 7, 1960. It comprises the housing 31, an intermediate sleeve 32, and the central core 33. The input port 34, to which is attached line 27, extends through housing 31 to communicate with the annular groove 35 extending entirely around the inner surface of housing 31. The intermediate ports 36 and 38, to which are attached lines 28 and 29, respectively, communicate with the annular grooves 37 and 39. Similarly, the outlet port 40, to which is attached line 30, communicates with the annular groove 41.

The core 33 includes the serrated coupling 33a which is linked through a suitable shaft 33b to the steering wheel 21. Projecting along core 33 is the slot 42, the purpose of which will be explained later. Core 33 extends within sleeve 32 and is provided with a plurality of relatively short longitudinally oriented and concentrically spaced channels 43, one of which is designated 43a. (Not all of channels 43 are shown.) Alternately spaced between the channels 43 are a plurality of relatively long longitudinally oriented and concentrically spaced channels 44, only one of which is shown. Extending transversely through core 33 is the passage 45. At either end of passage 45 is inserted a piston 46 closely machined to slide within the passage 45. Biasing pistons 46 is the spring 47. Pistons 46 bear upon the cam-like walls of boss 48 of sleeve 32.

Interconnecting the relatively short longitudinal channel 43a and the passage 45 is the bore 49 (see FIG. 6). Within bore 49 is the sleeve 50 having the valve seat 51 at one end thereof and the inturned flange 52 at the other end thereof. The ball valve 53 is situated within sleeve 50 and is biased by the spring 54 towards the valve seat 51.

Coupled to sleeve 32 is the pin 55 which is fixed to one end 19a of shaft 19 and which cooperates with slot 42 of core 33. Sleeve 32 is provided with a plurality of concentric ports 56, not all of which are shown, which are adapted to communicate inlet port 34 through annular groove 35 with channels 43. Similarly, a plurality of concentric ports 57 and 58, not all of which are shown, are adapted to communicate ports 36 and 38 with channels 43 and 44 through annular grooves 37 and 39 as core 33 is rotated relative to sleeve 32 within the limits defined by movement of pin 55 within slot 42. In addition, a plurality of ports 59, not all of which are shown, are adapted to communicate outlet port 40 with the relatively long channels 44 through annular groove 41. It is to be understood that one of the ports 56 is at all times in communication with annular groove 35 and channel 43a, thus communicating through bore 49 with passage 45. Likewise, one of the ports 59 is always in communication with annular groove 41 and the area defined within sleeve 32 by each boss 48.

Under normal operating conditions, as the vehicle moves in a straight line, control valve 20 assumes the bypass position shown in FIG. 2. In this position fluid flows into inlet port 34, around annular groove 35, through the ports 56, along the relatively short channels 43 and channel 43a, and thence across the face of ports 57 and 58, which in this position overlap channels 43 and 44, along channels 44, through ports 59, around annular groove 41, and out from outlet port 40. Valve 53 bears against seat 51 and no fluid flows from channel 43a to passage 45 against the pressure of fluid trapped within passage 45. Pistons 46 are biased against the camlike walls of boss 48 to maintain core 33 in a neutral position relative to sleeve 32.

During normal straight line operation front wheels 13 are subjected to vibration developing from road shocks. This vibration is transmitted through steering elements 18, 19, and 19a and pin 55 to sleeve 32 of control valve 20, causing a relative movement between sleeve 32 and core 33. It has been found that sympathetic vibrations set up within control valve 20 cause oscillation between the neutral bypass position shown in FIG. 2 and the right or left actuating position, one of which is shown in FIG. 4, in which ports 57 and 58 no longer overlap channels 43 and 44. In this event fluid enters inlet 34, passes through annular groove 35, ports 56, channels 43, ports 57, annular groove 37 and port 36 to one side of cylinder 22. Fluid returns from the other side of cylinder 22 through port 38, annular groove 39, ports 58, channels 44, ports 49, groove 41 and out through port 40 to reservoir. This momentary unwanted valve actuation, unless compensated for, causes a pulsating surge of fluid.

As each piston 46 rides up the walls of its associated boss 48, the pistons are, in effect, squeezed together against the fluid within passage 45. Their closely controlled fit results in a leakage of fluid under pressure from passage 45 past pistons 46 at a controlled and predetermined rate. This results in a dampening of the frequency of vibration between sleeve 32 and core 33 in addition to that provided by pressure of pistons 46 against bosses 48. The erratic machine gun-like opening and closing of the valve ports is sufficiently attenuated so that flow of fluid to cylinder 22 is limited and does not propagate the vibration in wheels 13 into a significant shimmy. As the valve returns from the actuating position shown in FIG. 4 to the neutral position shown in FIG. 2, each piston 46 rides down the walls of boss 48, relieving the pressure within passage 45. At this point the fluid within passage 43a opens ball valve 53 against the tension of biasing spring 54 and flows into passage 45.

Rotation of steering wheel 21 causes a normal turn by allowing flow as described above under controlled conditions. Steering wheel 21 acts through elements 33a and 33b to initially rotate core 33 relative to sleeve 32 from the neutral bypass position shown in FIG. 2 through the partial actuating position shown in FIG. 4 within the limits permitted by relative displacement of pin 55 along slot 42. As pin 55 reaches the end of slot 42, core 33 and sleeve 32 thereafter rotate together relative to housing 31 in this fully actuated position of valve 20 (not shown), during which the ports of sleeve 32 are so oriented with respect to the channels of core 33 that maximum flow to cylinder 22 is allowed. Return of valve 20 to the position shown in FIG. 2 relieves pressure in cylinder 22 to end the turn.

An alternative embodiment is shown in FIG. 7. Each piston 46 is provided with a seal 60 to prevent flow from passage 45 around pistons 46 as they ride up the walls of groove 48. Sleeve 50 is removed from bore 49 and in place of ball valve 53 a plug 61 is inserted within bore 49. Plug 61 defines an orifice 62 within which is placed a wire 63. Seepage of fluid through orifice 61 is critical and must be closely controlled. It has been found that a flow path having an area of .00012 sq. in. provided by inserting a wire of .038" diameter within an orifice of .040" diameter gives a satisfactory fluid flow pattern. As pistons 46 are squeezed together the fluid flows against pump pressure from passage 45 through orifice 62 at this closely controlled rate into passage 43a. As pistons 46 ride down the walls of grooves 48 towards the neutral position, fluid under pump pressure flows from passage 43a through orifice 62, returning to passage 45. Additionally, wire 63 serves to insure that foreign matter does not clog orifice 62. It is to be understood that the orifice and piston seals may be provided in addition to rather than in place of the ball valve, if necessary for additional control.

It is to be understood that changes may be made in the construction shown without departing from the spirit of the invention or the scope thereof as defined in the following claims.

What is claimed is:

1. In a fluid flow control valve, a housing having an inner surface defining a cylindrical chamber, a concentric annular sleeve within said cylindrical chamber having an outer surface slidably engaging said inner surface of said housing and an inner surface, a concentric cylindrical core within said cylindrical chamber having an outer surface slidably engaging said inner surface of said annular sleeve, means cooperating with said annular sleeve and said cylindrical core for allowing limited relative rotation therebetween, said housing defining an inlet port and an exhaust port each communicating with said cylindrical chamber and adapted to be connected to a source of fluid under pressure, said housing further defining a pair of intermediate ports each communicating with said cylindrical chamber and adapted to be connected to a fluid pressure operated device to deliver fluid under pressure thereto and to receive return flow therefrom, said inner surface of said housing defining first, second, third and fourth annular grooves each communicating with one of said inlet, exhaust, and pair of intermediate ports, respectively, said outer surface of said cylindrical core defining first and second sets of spaced axially oriented channels, said annular sleeve defining first, second, third and fourth sets of spaced ports extending therethrough each communicating with respective annular grooves, said first and second sets of spaced ports communicating with said first and second sets of spaced axially oriented channels, respectively, said third and fourth sets of spaced ports communicating with said first and second sets of spaced axially oriented channels, respectively, in one position of said cylindrical core relative to said annular sleeve and intercommunicating said first and second sets of spaced axially oriented channels in another position of said cylindrical core relative to said annular sleeve, said cylindrical core defining a transverse passage therethrough, said annular sleeve defining trough means opposite the ends of said transverse passage, a pair of pistons each slidably received in said transverse passage and adapted to ride in said trough means and be displaced thereby upon rotation of said cylindrical core relative to said annular sleeve, a spring in said transverse passage biasing said pistons toward said trough means, a bore interconnecting said transverse passage and at least one channel of said first set of axially oriented channels, and means for controlling the rate of fluid flow to and from said transverse passage upon rotation of said cylindrical core relative to said annular sleeve.

2. In the fluid flow control valve according to claim 1, said controlling means comprising a spring biased check valve in said bore blocking flow from said transverse passage to said channel.

3. In the fluid flow control valve according to claim 1, said controlling means comprising a plug in said bore defining a flow restricting orifice, and sealing means between each of said pistons and said transverse passage.

4. In the fluid flow control valve according to claim 3, said controlling means further comprising a wire freely engaged in said plug, said wire and said plug cooperating to define a predetermined flow restricting orifice.

5. In a fluid flow control valve, a housing having an inner surface defining a chamber, a sleeve within said chamber having an outer surface engaging said inner surface of said housing and an inner surface, a core within said chamber having an outer surface engaging said inner surface of said sleeve, means cooperating with said sleeve and said core for allowing limited relative movement therebetween, said housing defining an inlet port and an exhaust port each communicating with said chamber and adapted to be connected to a source of fluid under pressure, said housing further defining at least two intermediate ports communicating with said chamber and adapted to be connected to a fluid pressure operated device, said sleeve and core defining cooperating port and passage means for communicating said inlet port with one of said intermediate ports and said exhaust port with the other of said intermediate ports in one position of said core relative to said sleeve and communicating said inlet port with said exhaust port in another position of said core relative to said sleeve, said core defining a transverse passage therethrough, said sleeve defining cam means at each end of said transverse passage, a pair of pistons in said transverse passage being biased toward said cam means and adapted to be displaced thereby upon movement of said core relative to said sleeve, means communicating said transverse passage with said inlet port, and means for controlling the flow to and from said transverse passage upon movement of said core relative to said sleeve.

6. In the fluid flow control valve according to claim 5, said communicating means including a bore, said controlling means comprising valve means in said bore for blocking flow from said transverse passage thereby directing flow from said transverse passage past said pistons upon displacement thereof by said cam means.

7. In the fluid flow control valve according to claim 5, said communicating means including a bore, said controlling means comprising a plug in said bore defining a flow restricting orifice, and means for preventing flow from said transverse passage past said pistons.

8. In the fluid flow control valve according to claim 7, said controlling means further comprising a wire freely engaged in said plug, said wire and said plug cooperating to define a predetermined flow restricting orifice.

9. In a fluid control device, a housing defining a chamber, a sleeve within said chamber engaging said housing, a core within said chamber engaging said sleeve, first mechanical means connected with said core, second mechanical means connected with said sleeve, third means cooperating with said sleeve and core for allowing limited relative movement therebetween upon initial movement of one of said mechanical means, said third means allowing movement of said sleeve and core relative to said housing upon continued movement of said mechanical means, said housing defining an inlet port and an exhaust port each communicating with said chamber and adapted to be connected to a source of fluid under pressure, said housing further defining first and second intermediate ports communicating with said chamber and adapted to be connected to a hydraulic power assist cylinder, said housing defining first, second, third and fourth interior passages in constant communication with said inlet, first intermediate, second intermediate and exhaust ports, respectively, said sleeve and core defining cooperating port and passage means for communicating said first interior passage with said second interior passage in one position of said core relative to said sleeve upon initial movement thereof and communicating said first interior passage with said second interior passage and said third interior passage with said fourth interior passage in another position of said core relative to said sleeve upon initial movement and upon continued movement thereof, said core defining a passage having at least one exterior opening, said sleeve having trough defining cam means opposite said passage, at least one piston in said passage biased toward said trough and adapted to be displaced by said cam means upon movement of said core relative to said sleeve, means communicating said passage with said first interior passage, and means for controlling the flow to and from said passage upon movement of said core relative to said sleeve.

10. In the fluid flow control valve according to claim 9, said communicating means including a bore, said controlling means comprising valve means in said bore for blocking flow from said transverse passage thereby directing flow from said transverse passage past said pistons upon displacement thereof.

11. In the fluid flow control valve according to claim 9, said communicating means including a bore, said controlling means comprising a plug in said bore defining a flow restricting orifice, and means for preventing flow from said transverse passage past said pistons upon displacement thereof.

12. In the fluid flow control valve according to claim 11, said controlling means further comprising a wire freely engaged in said plug, said wire and said plug cooperating to define a predetermined flow restricting orifice.

13. In the fluid flow control valve according to claim 10, said controlling means further comprising a plug in said bore defining a flow restricting orifice, and means for preventing flow from said transverse passage past said pistons upon displacement thereof.

14. In a fluid flow control valve, a first valve element defining a chamber, a second valve element within said chamber movably engaging said first element, means cooperating with said elements for allowing relative movement therebetween, said first element defining an inlet port, an exhaust port, and at least one intermediate port, said elements defining cooperative port and passage means for communicating said inlet port with said intermediate port in one relative position of said elements and communicating said intermediate port with said exhaust port in another relative position of said elements, one of said elements defining a passage, the other of said elements defining cam means opposite said passage, at least one piston in said passage and extending therefrom for engagement with said cam means so as to be displaced thereby upon relative movement of said elements, means communicating said passage with said inlet port, and means for controlling the flow to and from said passage upon relative movement of said elements.

References Cited in the file of this patent
UNITED STATES PATENTS
3,017,945      MacDuff _____ Jan. 23, 1962